July 16, 1957   E. J. PARKER   2,799,523
PRESSURE-ACTUATED SEALS
Filed May 6, 1954
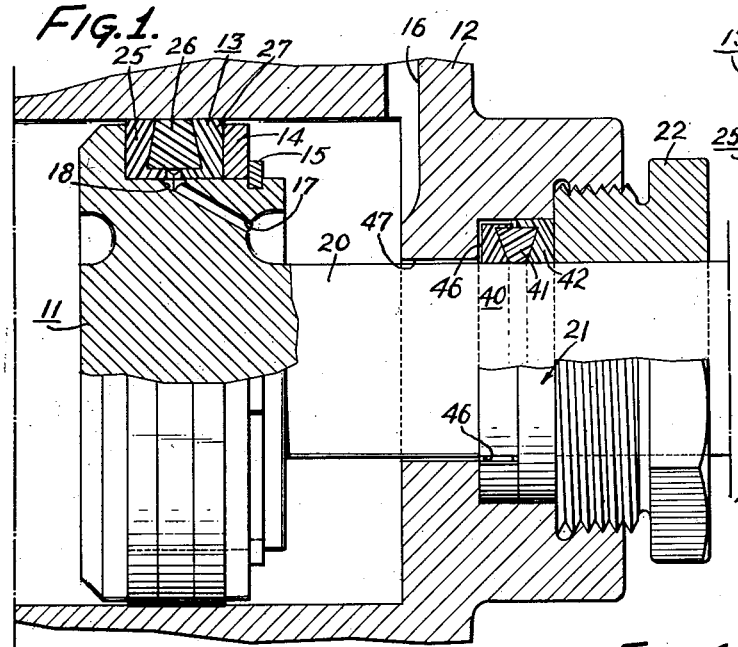
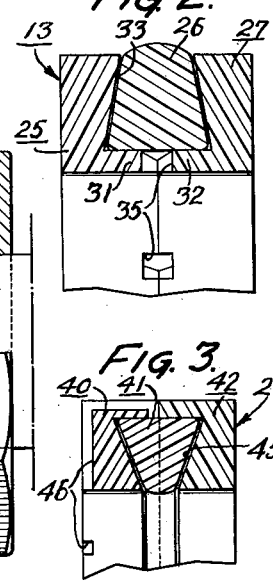
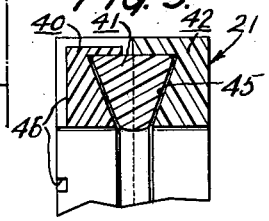
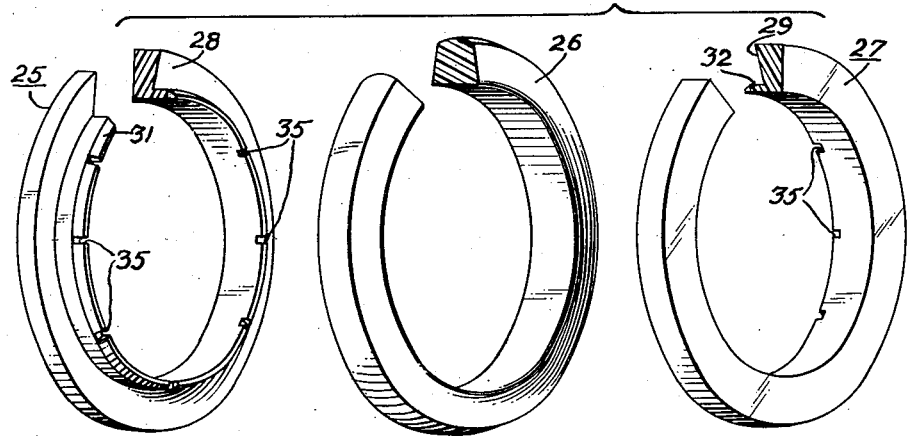
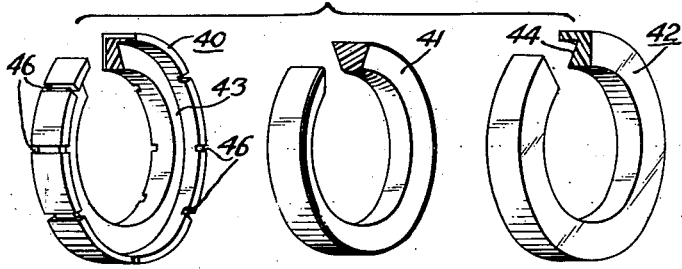
Inventor:
Elliot J. Parker
by his Attorneys
Howson & Howson

United States Patent Office 2,799,523
Patented July 16, 1957

2,799,523

PRESSURE-ACTUATED SEALS

Elliot J. Parker, Narberth, Pa., assignor to Linear, Incorporated, a corporation of Pennsylvania Application May 6, 1954, Serial No. 427,899

4 Claims. (Cl. 286—26)

The present invention relates to improvements in pressure-actuated seals in which the pressure of the fluid being sealed is employed to effect sealing engagement of the sealing member with the associated structure.

Prior to the present invention, conventional pressure seals for high pressure fluids have employed flexible resilient members formed of rubber or like materials for sealing the pressure fluid. Material of this character performs adequately within normal operating ranges, but in installations where the seal is subjected to a wide range of pressures and temperatures, the conventional sealing material has proved inadequate. This is especially true in aircraft installations where the temperature may range from —65 degrees F. to 400 degrees F., and the pressure may be as high as 3000 p. s. i. Under such conditions, the conventional sealing material has a tendency to extrude into the clearance between the members being sealed and the sealing material rapidly deteriorates so as to shorten the effective life of the seal.

It has been proposed to use other elastomers for these seals but a problem has been encountered in attempting to find an elastomer which has the necessary resiliency to effect a seal, and at the same time, will not be damaged by th extreme temperature and pressure conditions of the installation.

With the foregoing in mind, a primary object of the present invention is to provide a seal construction which obviates the necessity for high resiliency, i. e., the power to recover the original size and shape after deformation, in the material used as the sealing element.

Another object of the present invention is to provide a seal wherein the sealing pressure is supplied by the pressure fluid substantially independent of the resiliency of the material forming the seal.

Still another object of the present invention is to provide a seal construction which reduces the tendency of the sealing material to extrude.

These and other objects of the invention and the various features and details of the construction and operation thereof are more fully set forth hereinafter with reference to the accompanying drawing in which:

Fig. 1 is a fragmentary view of a cylinder and piston assembly embodying internal and external seals made in accordance with the present invention;

Fig. 2 is a detached sectional view of an external seal made in accordance with the present invention;

Fig. 3 is a detached sectional view of an internal seal made in accordance with the present invention; and, Figs. 4 and 5 are exploded perspective views of the seals shown in Figs. 2 and 3 respectively.

Referring to the drawing, Fig. 1 illustrates a piston and cylinder assembly having mounted therein both an internal and an external seal made in accordance with the present invention. As shown, the piston 11 is mounted for axial sliding movement in the cylinder 12. An external seal 13 is mounted on the piston, for example by a positioning ring 14 and snap ring 15 so as to contact the interior wall of the cylinder in sealing engagement therewith. A port 16 is formed in the cylinder wall to afford access of the high pressure fluid into the chamber behind the piston 11. In accordance with the invention, the sealing pressure on the seal 13 is provided by the pressure fluid in the rear cylinder chamber. To this end, the piston 11 is formed with a plurality of conduits 17 communicating with an annular groove 18 underlying the sealing member 13.

The rod 20 of the piston is slidably mounted in the cylinder 12 and is sealed against the escape of pressure fluid by a sealing member 21. The sealing member is held in place by the conventional gland ring 22. The sealing member is seated in the cylinder and bears against the piston rod 20 under the bias of the pressure fluid within the rear cylinder chamber as will be described more fully hereinafter.

In accordance with the invention, the sealing member 13 is formed of three annular members 25, 26, and 27 respectively. The outer members 25 and 27 are formed at their inner periphery with flanges 31 and 32 respectively (see Fig. 4). The flange of each member defines a groove 28 and 29 respectively in the interior radial surface of the member. The flanges 31 and 32 abut each other when the member 13 is assembled, for example as shown in Fig. 2, so that the grooves 28 and 29 define a tapered recess 33 in the assembled member 13 which tapers radially outward as shown in Fig. 2. The central member 26 seats in the recess 33 and is formed with angularly disposed sides conforming to the angle of taper of the sides of the recess 33. The outer periphery of the member 26 is greater than the cylinder bore in which it fits, as shown in Fig. 2 but is adapted to be compressed when the sealing member 13 is assembled in the cylinder. This is apparent in Fig. 1.

Although the member 26 is compressed when the sealing member 13 is installed in the cylinder, the seal does not depend on the resiliency of the member 26, but rather depends on the pressure of the fluid in the rear cylinder chamber. To this end, the flanges 31 and 32 are notched as indicated at 35 to afford communication between the inner peripheral surface of the member 26 and the annular groove 18 in the piston 11. Thus, when the pressure fluid is introduced into the rear cylinder chamber through the port 16, the sealing member 26 is biased outwardly by the action of the pressure fluid on the inner peripheral surface thereof through the conduits 17, the groove 18, and the notches 35.

Another important feature of the invention is the tapered side walls of the groove 33 which receive the member 26. Because of the taper of the walls, the outward bias on the member 26 will be transmitted to the members 25 and 27 so that their peripheral surfaces are biased outwardly by the radial component of the force acting on the tapered walls of the grooves 28 and 29. The outward bias on the members 25 and 27 serves to close the clearance between these members and the cylinder wall. By closing the clearance between these members, there is a substantial reduction in the tendency of the central member 26 to extrude into the clearance between the cylinder wall and the members 25 and 27 respectively.

Thus, it is seen that the present invention provides a sealing device which acts substantially independently of the resiliency of the material composing the sealing members. In addition, the present construction greatly reduces the tendency of the material composing the sealing members to extrude axially outward along the cylinder wall.

The internal seal 21 is formed similarly to the seal 13. The sealing device 21 comprises three annular members 40, 41, 42 respectively corresponding to the members 25, 26, and 27. The members 40 and 42 are formed with internal grooves 43 and 44 which cooperate to define a recess 45. The side walls of the recess 45 are tapered inwardly at an angle corresponding to the angle of taper of the member 41 so that when pressure fluid is introduced behind the member 41, a radial bias is exerted on the inner peripheral surfaces of the members 43 and 44 respectively.

To introduce pressure fluid to the outer peripheral surface of the member 41, conduits 46 are formed in the member 40. The conduits 46 obviate the necessity for conduits in the cylinder head. As shown in Fig. 3, the conduits take the form of grooves in the side wall and the outer peripheral wall of the member 40. Fluid communication between the conduits 46 and the rear pressure chamber in the cylinder 12 is afforded through the clearance between the cylinder head and the piston rod 20. Normal clearance is sufficient to provide this communication, but for the purposes of illustration, the clearance is exaggerated in Fig. 1 as indicated at 47. From the foregoing description, it is seen that the interior seal 21 is possessed of the same characteristics as the exterior seal 13.

A preferred material for forming the sealing elements is a polymer of tetrafluoroethylene known as "Teflon," but other synthetic resins may be used with equally effective sealing action. It is desirable to use materials that are highly inert chemically, as well as being stable physically under extreme temperature and pressure conditions. As pointed out above, the present construction eliminates the requirement of high resiliency, and only a small degree of flexibility and compressibility is necessary. Thus, the present invention greatly expands the field of materials which may be employed to fabricate seals of the stated type.

It is not intended to limit the interior and exterior seals to the specific construction and arrangement shown in the drawings, but changes and modifications may be made therein and thereto without departure from the invention. For example, the conduits for the interior seal 21 may be formed in the cylinder head in lieu of the conduits 46; and the conduit 17 and groove 18 in the piston 11 may be replaced by conduits in the member 29 similar to those in the member 40. Other changes and modifications may be made in and to the invention within the scope of the following claims.

I claim:

1. For two coaxial members disposed one within the other and defining a chamber containing a pressure fluid, a sealing device mounted on one of said members and extending radially into sealing engagement with the confronting surface of the second member comprising a pair of opposed relatively incompressible deformable elements extending continuously about said one member and having respectively spaced-apart confronting radial faces disposed at one end adjacent said confronting surface of the second member, diverging in a direction interiorly of said one member, and terminating at the opposite end in substantially continuous inturned axial flanges extending one toward the other to define with said radial faces a continuous peripheral tapered groove confronting said second member, an annular sealing element mounted in said groove having radial walls conforming to and engaging the radial faces of said opposed elements and an exposed peripheral surface for sealing engagement with said second member, and conduit means affording fluid communication between the opposite peripheral surface of said annular sealing element and said chamber containing pressure fluid, whereby said pressure fluid exerts a bias on said annular sealing element to effect sealing engagement of the exposed peripheral surface thereof with the said second member, said bias being operable to bias the one end of said opposed elements into engagement with said second member to limit extrusion of said sealing element between said opposed elements and said second member.

2. For two coaxial members disposed one within the other and defining a chamber containing a pressure fluid, a sealing device mounted on one of said members and extending radially into sealing engagement with the confronting surface of the second member comprising a pair of opposed relatively incompressible deformable elements extending continuously about said one member and having respectively spaced-apart confronting radial faces disposed at one end adjacent said confronting surface of the second member, diverging in a direction interiorly of said one member, and terminating at the opposite end in substantially continuous inturned axial flanges extending one toward the other to define with said radial faces a continuous peripheral tapered groove confronting said second member, an annular sealing element mounted in said groove having radial walls conforming to and engaging the radial faces of said opposed elements and an exposed peripheral surface for sealing engagement with said second member, and conduits formed in one of said opposed elements affording fluid communication between the opposite peripheral surface of said annular member and said chamber containing pressure fluid whereby said pressure fluid exerts a bias on said annular member effecting sealing engagement of the exposed peripheral surface thereof with the said second member, said bias being operable to bias the one end of said opposed elements into engagement with said second member to limit extrusion of said sealing element between said opposed elements and said second member.

3. For two coaxial cylindrical members disposed one within the other and defining a chamber containing a pressure fluid, a sealing device mounted on the outer surface of the inner member and extending radially outward into sealing engagement with the confronting interior surface of the outer member comprising a pair of opposed relatively incompressible deformable elements extending continuously about said inner member and having respectively spaced-apart confronting radial faces disposed at the outer end adjacent said interior surface of the outer member, diverging inwardly and terminating at the opposite end in substantially continuous inturned axial flanges extending one toward the other to define with said radial faces a continuous peripheral tapered groove confronting said other member, an annular sealing element mounted in said groove having radial walls conforming to and engaging the radial faces of said opposed elements and an outer exposed peripheral surface for sealing engagement with said outer member, and conduits affording fluid communication between the inner peripheral surface of said annular member and said chamber containing pressure fluid whereby said pressure fluid exerts an outward bias on said annular member effecting sealing engagement of the outer exposed peripheral surface thereof with the said outer member, said bias being operable to bias th outer end of said opposed elements into engagement with said outer member to limit extrusion of said sealing element between said opposed elements and said outer member.

4. For two coaxial cylindrical members disposed one within the other and defining a chamber containing a pressure fluid, a sealing device mounted in the inner surface of the outer member and extending radially inward into sealing engagement with the confronting exterior surface of the inner member comprising a pair of opposed relatively incompressible deformable elements extending continuously about said outer member and having respectively spaced-apart confronting radial faces disposed at the inner end adjacent said inner member, diverging outwardly and terminating at the outer end in substantially continuous inturned axial flanges extending one toward the other to define with said radial faces a continuous peripheral tapered groove confronting said inner member, an annular sealing element mounted in said groove having radial walls conforming to and engaging the radial faces of said opposed elements and an inner exposed peripheral surface for sealing engagement with said inner member, and conduits affording fluid communication between the outer peripheral surface of said annular member and said chamber containing pressure fluid whereby said pressure fluid exerts an inward bias on said annular member effecting sealing engagement of the inner exposed peripheral surface thereof with the said inner member, said bias being operable to bias the inner end of said opposed elements into engagement with said inner member to limit extrusion of said sealing element between said opposed elements and said inner member.

References Cited in the file of this patent

UNITED STATES PATENTS

| | | |
|---|---|---|
| 831,603 | Davis | Sept. 25, 1906 |
| 1,921,996 | Van Hooydonk | Aug. 8, 1933 |
| 2,022,599 | Leuschner | Mar. 9, 1935 |
| 2,567,527 | Park | Sept. 11, 1951 |

FOREIGN PATENTS

| | | |
|---|---|---|
| 55,363 | Germany | Mar. 9, 1891 |